United States Patent

[11] 3,543,786

[72] Inventor Joseph C. Woodford
 205 N. Buchanan St., Spring Lake,
 Michigan 49456
[21] Appl. No. 742,462
[22] Filed July 3, 1968
[45] Patented Dec. 1, 1970

[54] VACUUM BREAKER
 10 Claims, 6 Drawing Figs.
[52] U.S. Cl. .................................................. 137/218,
 137/798; 285/90, 285/92, 285/355
[51] Int. Cl. ..................................................... F16k 45/00
[50] Field of Search ........................................... 137/217,
 218, 798; 285/80, 81, 90, 92, 108, 354, 355

[56] References Cited
 UNITED STATES PATENTS
 2,997,054 8/1961 Woodford .................... 137/218

Primary Examiner—Robert G. Nilson
Attorney—Petherbridge, O'Neill & Lindgren

ABSTRACT: A vacuum breaker construction designed to accommodate a vacuum breaker to a faucet outlet in a manner such that at least a portion of the vacuum breaker is permanently secured to the faucet outlet. A collar has been developed which can be telescoped over a portion of the vacuum breaker and in overlapping relationship with respect to a faucet outlet; and utilizing a nonremovable screw, the assembly can be permanently secured to the faucet outlet. In an alternate embodiment, the end of the vacuum breaker which is connected to the faucet outlet may be directly and permanently secured to the faucet outlet utilizing a breakoff screw element threaded through the body of the vacuum breaker and into compressive engagement with the outer surface of the faucet outlet in a manner such that the means for threading the screw through the vacuum breaker body will be broken off upon the exertion of a predetermined force. Another embodiment utilizes a spring, anchored at one end and threaded to the threads coupling the vacuum breaker to an outlet, for permanently securing a vacuum breaker element to a faucet outlet. A means is also provided for protecting a fluid sealing gasket and the vacuum breaker from radial or axial extrusion.

Patented Dec. 1, 1970 3,543,786
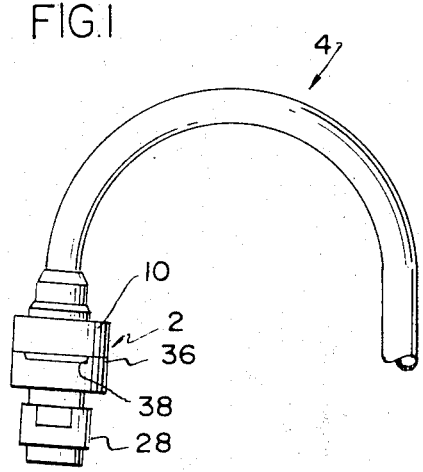
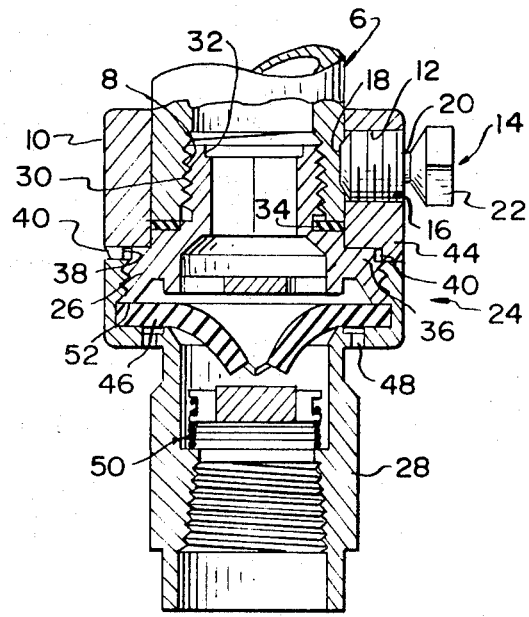
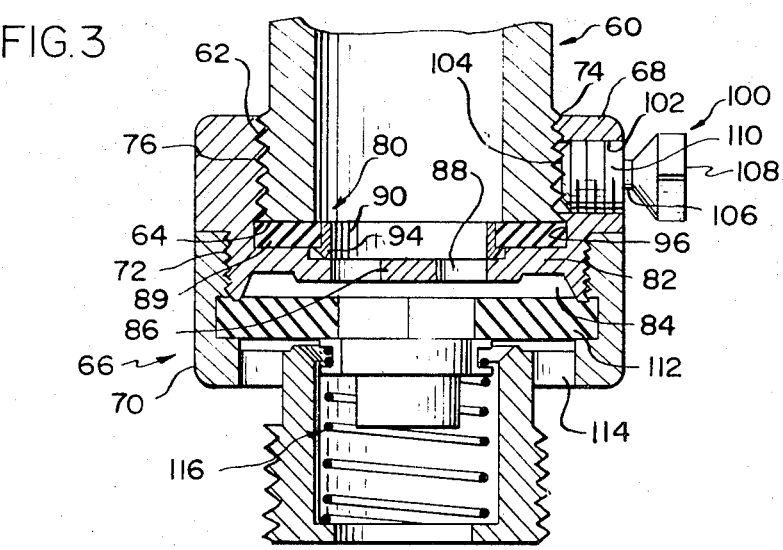
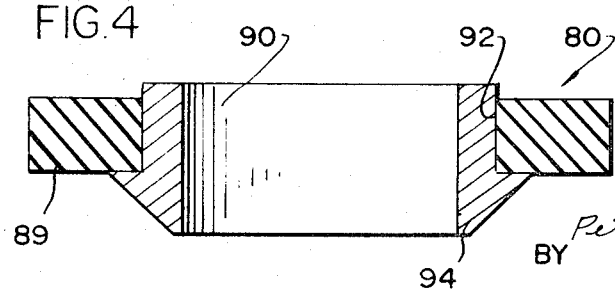
INVENTOR.
JOSEPH C. WOODFORD
BY Petherbridge, O'Neill & Aubel.
ATTORNEYS.

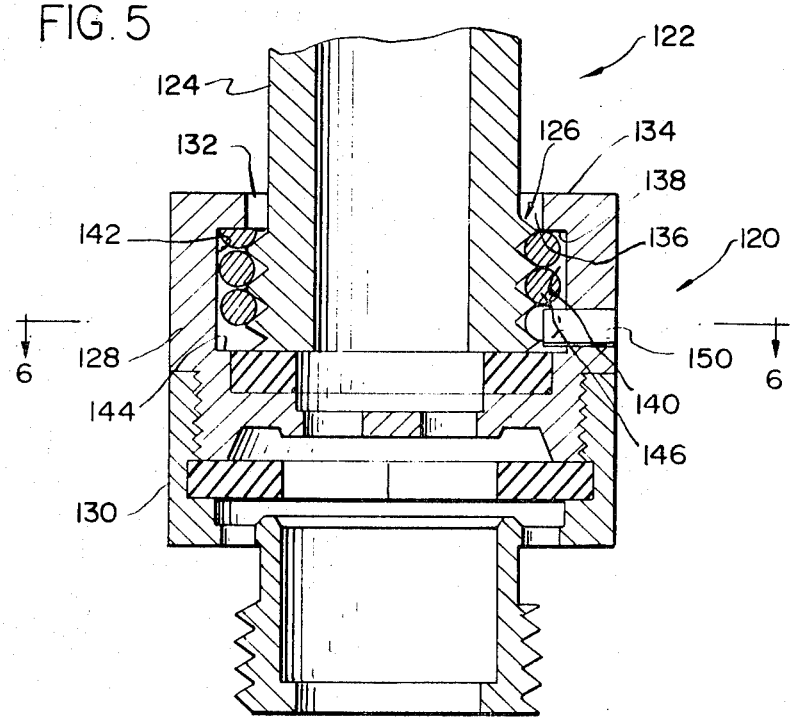

VACUUM BREAKER

The present invention relates to vacuum breaker assemblies utilized in connection with fluid outlets to prevent undesired reverse flow of fluid, ordinarily a liquid, into and through the outlet as well as connecting conduits. Such reverse fluid flow is ordinarily caused by the production of vacuum conditions to the fluid transmission system. The present invention relates more particularly, to a vacuum breaker assembly at least a part of which, can be permanently secured to a faucet outlet and wherein the permanently secured fluid sealing gasket of the assembly can be protected against axial and radial extrusion or creep.

Faucets of the type used in laboratories, as sill cocks on the exterior of buildings, in janitors' wash sinks, in laundry tubs, and other locations where vacuum induced back-siphoning can occur, are now being frequently provided with vacuum breakers of the types set forth in applicant's U.S. Pat. Nos. Re. 26,235, which issued July 18, 1967, for a Vacuum Breaker; 3,023,767, which issued Mar. 6, 1962 for a Vacuum Breaker; and applicant's copending application Ser. No. 442,601, filed Mar. 25, 1965, now U.S. Pat. No. 3,414,401, for Antisiphon Outlets, now allowed. Vacuum induced back-siphoning can occur in most liquid flow systems if the outlet end of a hose or conduit coupled to the outlet is placed in a vessel, gutter or other liquid containing object, and line pressure in the system supplying liquid to the conduit or hose drops a sufficient degree to produce a vacuum in the flow system which will act to induce back-siphonage of the liquid from the vessel, gutter or liquid container through the hose or conduit into and through the faucet and ultimately the entire liquid supply system. Since such liquids may be too highly contaminated for consumption or dangerous if contacted, it is now becoming recognized as essential that vacuum breaker means be provided at such outlets to prevent the back-siphoning of liquid or a liquid-solid mixture into the liquid supply system.

Vacuum breakers are being specified with increasing frequency by the building codes of many municipalities as they relate to faucet installations. Some presently known vacuum breakers, however, are adapted only to be built into certain types of faucet outlets and many of these are quite large and must therefore be space oriented, that is, they must be placed with respect to gravity so that floats and the like can properly operate to obtain the opening of an air vent passage to prevent back-siphonage through the outlet passage of a faucet. Many faucets which are presently in use are not of a design which is conducive to the accommodation of such relatively large or space oriented vacuum breakers. As a result of this, applicant has developed vacuum breakers which are compact in size and are capable of being applied to most faucet outlets.

One shortcoming has been found, however, in the use of presently available vacuum breakers. With the exception of the vacuum breakers set forth in the above mentioned U.S. Pat. application Ser. No. 442,601, most vacuum breaking systems are designed to be removably connected to the outlet portion of a faucet. If, after removal of such a vacuum breaker from the outlet portion of the faucet, a conventional hose coupling is attached to the now exposed threads of the faucet or a flexible tube is telescoped over the faucet outlet, the entire purpose of the vacuum breaker can be circumvented and back-siphoning conditions can cause the accidental introduction of contaminated liquid into the liquid distribution system. In this manner, the entire liquid supply available in such a system can be contaminated with potentially disastrous results.

The ever increasing danger of the pollution or contamination of water supply system by vacuum induced back-siphonage of contaminated liquids into the water supply system has necessitated the installation of vacuum breaker or antisiphon devices on most exposed faucet outlets for water systems which are used in whole or in part for human consumption. While plumbing authorities can require the installation of vacuum breaking devices and can make proper inspection to approve the original installation, it is generally not possible or practicable to make repeated reinspections of the many vacuum breaker installations. Therefore, it has been found to be vitally important to make certain that the antisiphon protection produced by vacuum breaker devices cannot be avoided by merely removing the vacuum breaking device after the installation inspection has been completed.

The vacuum breaker assembly of the invention is designed for essentially permanent securement to almost any presently available previously installed faucet outlet. Further, the device is so constructed that the securement of a hose coupler or telescoping of a flexible conduit over the remaining portion of the vacuum breaker on the faucet outlet becomes exceedingly difficult.

The vacuum breaker construction of the invention includes a vacuum breaker body which, to facilitate assembly of its components, is provided with fluid inlet and outlet members containing a liquid flow passage. A back flow resisting valve, such as a diaphragm valve, is provided across the liquid flow passage in the body of the vacuum breaker to prevent return flow of liquid through the vacuum breaker and into the faucet outlet. Air vent passages are generally provided downstream from the back flow resisting valve to vent the liquid flow passage of the vacuum breaker to atmosphere when the valve is in closed position and essentially now flow is being discharged from the faucet outlet. The inlet member of the vacuum breaker is connected to the outlet extremity of the faucet. A fluidtight relationship is produced with this coupling by a resilient gasket disposed between the extremity of the faucet outlet and the inlet end portion of the vacuum breaker. This gasket is protected from both radially directed extrusion or creep of the resilient material comprising the liquid sealing gasket as well as axial extrusion of the gasket material. Such extrusion or creep is ordinarily produced by a combination of the compression of the gasket by the faucet and vacuum breaker elements, the flow of fluid through the vacuum breaker, and the passage of time.

A collar member has been developed for use in the permanent securement of a vacuum breaker or portion thereof to a faucet outlet. This collar member is designed to be at least partially telescoped over the connected end of a vacuum breaker and in overlapping relationship with respect to the faucet outlet to which the vacuum breaker is connected. This locking collar is provided with axially projecting extensions which engage surface portions on the vacuum breaker body in a manner such that those portions of the vacuum breaker body cannot be rotated for removal from a faucet to which they are connected. The locking collar is provided with a threaded passage into which a suitable screw, and preferably the breakoff type, can be threaded in a manner such that the screw is connected to the collar member and compressively engaged with the outer surfaces of the faucet outlet in a manner such that the screw cannot be removed.

In an alternate embodiment, the inlet member of the vacuum breaker, when connected to the extremity of the faucet outlet in fluidtight engagement, is permanently secured to the faucet outlet by a screw which is threaded through a portion of the vacuum breaker wall and into compressive engagement with the threaded exterior wall of the faucet outlet. This screw is constructed with a threaded body portion for threading through the vacuum breaker and into engagement with the outer wall of the faucet outlet, a generally constricted neck portion, and an enlarged head portion having flatted surfaces for wrench gripping. When the screw is threaded into engagement with the faucet outlet, the exertion of a predetermined engaging force on the screw head will result in the twisting or breaking off of the head portion of the screw at the point of neck constriction. The twisting off of the head portion of the screw serves to permanently anchor the vacuum breaker inlet member to the faucet outlet.

In a modified vacuum breaker of the invention, a resilient means, such as a coil spring, is positioned within the inlet end portion of the body of the vacuum breaker. This resilient means is designed for threaded engagement with the threaded end of a fluid outlet, such as a faucet outlet, when it is desired to substantially permanently secure the inlet portion of the vacuum breaker body to the faucet.

This essentially permanent connection of a vacuum breaker element to a faucet is facilitated by providing a pin in the vacuum breaker body which will contact an end portion of a coil spring and urge the spring into firm fitting threaded engagement with the threaded outlet end of a faucet as the vacuum breaker element is rotated onto the faucet. If an attempt should be made to rotate the vacuum breaker element in the opposite direction to remove the element, the pin exerts essentially no force on the spring end. Such attempted counter rotation of the vacuum breaker element results in the further constriction of the coil spring about the threaded end portion of the faucet thereby enhancing the integrity of the coil spring connection and defeating the attempted removal of the vacuum breaker element.

In some applications, an end of the coil spring can be secured directly to the body of the vacuum breaker instead of controlling the threading thereof by a pin. In such an application, the coil spring end could be welded directly to the vacuum breaker body or could be provided with a hook for insertion through and retention by a hole formed in the body.

In developments leading to the subject invention, it was found that the threads comprising the opening in either the vacuum breaker or collar, and into which the screw was threaded must have an axial strength essentially greater than the radial or twist strength of the neck portion of the breakoff screw to prevent the damage or destruction of the threads as the compressive engagement of the faucet outlet is being established by the turning down of the screw.

Various other objects and advantages of the invention will become more fully apparent from the following description and drawings illustrating presently preferred embodiments thereof and wherein:

FIG. 1 is a partial side elevation of a typical laboratory faucet outlet with a collar and vacuum breaker of the invention connected thereto;

FIG. 2 is a side elevation with parts broken away of the collar and vacuum breaker assembly of FIG. 1;

FIG. 3 is a modified version of the vacuum breaker assembly and faucet outlet illustrated in FIG. 2;

FIG. 4 is an enlarged cross-sectional view of a resilient liquid sealing gasket and rigid support ring of the invention;

FIG. 5 is a modified version of the vacuum breaker assembly and faucet outlet illustrated in FIG. 3; and FIG. 6 is a cross-sectional view taken along lines 6–6 of FIG. 5.

Referring to FIG. 1 of the drawings, a vacuum breaker assembly, generally designated 2, is connected in liquidtight relationship with the outlet portion of a laboratory faucet, generally designated 4.

Referring now to FIG. 2, the outlet extremity of the laboratory faucet 4 is generally designated 6. The outlet extremity 6 is internally threaded at 8 as shown in FIG. 2. An annular collar or locking member 10 is disposed in overlapping or telescoping relationship with respect to the extremity 6 of the laboratory faucet. The annular collar 10 is provided with a threaded passage 12 which extends in a substantially radial direction through the wall of the collar.

A screw, generally designated 14, is provided with a threaded body portion 16 which is threaded into passage 12 until screw end 18 is urged into compressive engagement with the outer peripheral surface of outlet extremity 6 of the laboratory faucet 4. Screw 14 also includes a substantially constricted neck portion 20 projecting in a generally axial direction from the body portion 16 of the screw, and a head portion 22 extends similarly from the constricted neck 20. As can be seen in FIG. 2, the head portion 22 of the screw is flatted to provide suitable wrench or tool grips for threading the screw 14 into compressive engagement with the extremity 6 of the laboratory faucet.

It has been found to be preferable in fabricating the annular collar 10 and the screw 14 of the vacuum breaker assembly of the invention to use brass or a similar alloy in making the collar and stainless steel or a similar alloy in making the screw. In any event, however, it is important that the combined strength of the threads forming threaded passage 12 will exceed the twist or breaking strength of the neck portion 20 of the screw so that the threading of the screw 14 into passage 12 and into compressive engagement with a surface of faucet extremity 6 will cause the twisting off or breaking off of the screw head portion 22 before the threads in passage 12 are damaged.

It can be seen in FIG. 2 that the vacuum breaker assembly of the invention includes a vacuum breaker body, generally designated 24, which is composed of an inlet member or element 26 and an outlet element or member 28. The inlet element 26 is shown to include an externally threaded portion 30 adjacent inlet opening 32 thereof. The externally threaded portion 30 of the inlet element 26 is threaded internally into faucet extremity 6 and threads 8 thereof. A liquid sealing gasket 34 is provided between the opposed end surfaces of laboratory faucet 4 and inlet element 26.

As can be seen in both FIGS. 1 and 2, the inlet element 26 is provided with an annular cap portion 36 which projects radially outwardly from the inlet element at a point spaced below the externally threaded portion 30 thereof. This cap portion 36 is formed with a pair of recesses 38 and 40, respectively. It can be observed in both FIGS. 1 and 2, that the annular collar 10 includes a pair of projections 42 and 44, respectively, which extend axially downwardly and into alinement with recesses 38 and 40, respectively. Therefore, when the inlet element 26 has been threaded into liquidtight engagement with the faucet extremity 6, the annular collar 10 may be telescoped over the laboratory faucet 4 in a manner such that projections 42 and 44 are alined within recesses 38 and 40 of inlet element 26. When screw 14 is properly tightened, the inlet element 26 of the vacuum breaker 24 is prevented from rotating or being rotated in either direction, thereby precluding the removal of this portion of the vacuum breaker body 24 from the laboratory faucet outlet without permanently damaging the faucet.

With this construction, the outlet element or member 28 of the vacuum breaker may be removed from the laboratory faucet 4 by unscrewing the threaded connection between the outlet element 28 and the inlet element 26. This may be done to service the flexible backflow resisting valve 46 of the vacuum breaker, the air vent ports 48, the valve spring and follower assembly, generally designated 50, when used or to replace the entire outlet element. While the outlet element may be removed, the inlet structure remaining permanently attached to the laboratory faucet is of such a nature that, as a practical matter, it is almost impossible to telescope an ordinary flexible hose or tube over the remaining end structure or to thread a conventional hose coupling onto the remaining threaded end 52 of the inlet element 26.

Referring now to an alternate embodiment of the invention illustrated in FIG. 3, it can be seen that the annular collar element used in securing a portion of a vacuum breaker unit to a faucet outlet, as shown in FIGS. 1 and 2, has been eliminated. In this embodiment, the faucet outlet, generally indicated as 60 is externally threaded at 62 adjacent extremity or distal end 64 of the faucet outlet.

The vacuum breaker assembly of the invention is generally designated 66. The vacuum breaker is basically composed of an inlet member 68 and an outlet member 70. These members are threaded together at 72 to form the body of vacuum breaker.

The inlet member 68 of vacuum breaker 66 has a generally annular configuration. A bore or passage portion of the inlet member 68 opens at 74 and the passage is internally threaded at 76. As is shown in FIG. 3, inlet member 68 is threaded onto the threaded portion 62 of faucet outlet 60 to provide for the threaded coupling of the faucet outlet and the inlet member.

When the inlet member 68 is initially coupled to faucet outlet 60, a resilient gasket and ring assembly, best seen in FIG. 4 and generally designated 80, is supported upon an annular flange 82 formed adjacent outlet end 84 of inlet member 68. As can be seen in FIG. 3, the flange extends radially inwardly of the inlet member. Inlet member 68 is further provided with an essentially horizontally extending web portion 86 which extends between the opening provided by annular flange 82, and is preferably formed integrally with respect to the annular flange. Web portion 86 is provided with a plurality of flow openings 88 which provide a continuous liquid passageway from faucet outlet 60 through inlet member 68 and outlet end 84 of the inlet member.

As is shown in both FIGS. 3 and 4, the gasket and ring assembly 80 consist of a resilient annular gasket 89, preferably fabricated from a durable rubber or synthetic material, and a rigid metal ring 90 firmly engaging the inner peripheral wall 92 of the gasket. The ring 90 is axially elongated with respect to gasket 89 and includes a portion which extends below gasket 89. The lower extended portion of the ring 90 is formed with a generally peripherally continuous radially outwardly extending flange or hook portion 94 which overlaps a portion of the underside of gasket 89 when in position. In assembling the gasket 89 to the inlet member 68, the gasket is forced into an annular slot 96 provided by the annular flange 82 and internal threads 76 of the inlet member. This slot 96 is designed to firmly retain the gasket 89 and to inhibit the axial movement at the outer periphery thereof. After the gasket has been installed in the inlet member 68, the ring 90 and flange portion 94 thereof are forced through the opening provided by gasket wall 92 until the flanged portion 94 of the ring 90 is located in engagement with the lower horizontal gasket surface. When this has been accomplished, the inlet member can be threaded into firm fluidtight engagement with faucet outlet 60 with the distal end 64 thereof bearing firmly upon the generally horizontal surface of the gasket 89. Since this installation is designed to be essentially permanent in nature, the gasket arrangement of the invention is designed to enhance gasket life by substantially preventing the occurrence of radially inwardly directed extrusion or "creep" of the flexible gasket material as well as axially directed extrusion. "Creep", in such situations, is a long term result of the pressure being exerted upon the gasket 89 by distal end surface 64 of the faucet outlet and the opposing surface of the inlet member formed by annular flange 82. Also, creep production of flexible or resilient gasket material can be enhanced by liquid flow.

After the faucet outlet 60 and the inlet member 68 have been coupled in the desired fluidtight engagement with gasket 89, a breakoff screw, generally designated 100, and similar in most respects to that illustrated and described with respect to FIG. 2, is threaded into a radially extending threaded opening 102 formed near the upper end of inlet member 68. The screw is threaded into the opening until a predetermined compressive engagement is established with respect to the threaded portions 62 of the faucet outlet 60. This compressive engagement is such that the end surface 104 of screw 100 partially crushes a portion of the threaded portion 62 of the faucet outlet. At this predetermined point, the neck portion 106 will be twisted off or broken by the threading force being exerted upon head portion 108 of breakoff screw 100. Once the head and neck have been broken from the threaded body portion 110 of the screw, the inlet member 68 and faucet outlet 60 are substantially permanently secured together and rotation or removal of the inlet member from the faucet outlet is made almost impossible without producing the severe damage or destruction of the faucet outlet.

The outlet member 70 of the vacuum breaker 66 illustrated in FIG. 3 is similar in operation and function to that illustrated in FIG. 2. The outlet member includes a backflow preventing valve 112 which is compressively locked between the inlet member 68 and outlet member 70 when they are coupled together at 72. Also, air vent passages 114 are provided to prevent the development of vacuum conditions downstream from valve 112; and in some applications of the invention, a valve closure or follower assembly 116 may be used to insure the closure of valve 112 in the absence of liquid flow therethrough.

A modified embodiment of the invention is illustrated in FIGS. 5 and 6. As in the case of the previously discussed embodiments of the invention, an important objective of this embodiment is to provide a means for substantially permanently securing an element of a vacuum breaker to the threaded end of a faucet outlet.

Referring now, with particularity, to the features illustrated in FIGS. 5 and 6, it can be seen that the basic vacuum breaker body generally designated 120, is similar in many respects to that illustrated in FIG. 3 with the primary differences lying in the means employed for connecting body 120 to a faucet outlet, generally designated 122. Therefore, only the means for connecting the vacuum breaker 120 to the faucet 122 will be discussed in detail.

As is best shown in FIG. 5, faucet 122 includes a fluid flow conduit 124 and on enlarged threaded fluid outlet end portion 126. Fluid flow can therefore be directed through conduit 124 and out of outlet 126 into body 120 of the vacuum breaker.

Vacuum breaker 120 is composed of an inlet member 128 and an outlet member 130. These members are threaded together, as shown in FIG. 5, to form the body 120 of the vacuum breaker. The inlet member 128 has a generally annular configuration as can be observed in FIG. 6. An opening 132 is formed in inlet member 128 by the termination of a radially inwardly directed annular flange 134 projecting inwardly from the upper wall portion of inlet member 128. A connecter passage 136 extends axially downwardly or inwardly from opening 132 as a substantially continuous extension thereof. As can be seen in FIG. 3, the inner radial surface 138 of flange 134 forms a generally axially extending recess 140 with inner wall 142 and lower flange wall 144 of the inlet member 128 of vacuum breaker body 120. This passage is alined in essentially concentric relationship with respect to passage 136.

A coil spring 146 having a coil diameter smaller than that of the faucet outlet is positioned in recess 140 between wall 142 of the inlet member 128 and the threaded outlet end portion 126 of faucet 122. The coil spring 146 shown in FIGS. 5 and 6 is in firm threaded engagement with the threaded portion 126 of faucet 122. The upper end of coil spring 146 has been urged into substantially compressive engagement with the inner radial surface 138 of annular flange, thereby establishing firm and essentially permanent connection of the inlet member 128 to the faucet 122.

In order to facilitate the positive threading of the coil spring 146 onto the threaded portion 126 of faucet 122, a pin 150 is secured in the cylindrical wall of inlet member 128. As can be seen in both FIGS. 5 and 6, pin 150 projects from wall 142 of the inlet member a predetermined distance into recess 140 and connecter passage 136. The point of entry of pin 150 into recess is preferably adjacent lower flange wall 144 of the inlet member. Here, the pin can be brought into direct contact with the lowermost end 152 of coil spring 146, best seen in FIG. 6. The pin can thereby exert a positive rotational force upon the coil spring end 152 as inlet member 128 and coil spring 146 carried thereby are rotated into installing engagement with the threaded end of the faucet 122. Ultimately, the spring 146 is firmly secured to the threaded portion 126 of the faucet with the uppermost portion of the spring 146 being brought into firm engagement with flange 134.

When the inlet member of this embodiment is properly installed upon a faucet, an attempt to remove it from the faucet without severely damaging the member and the threaded faucet end by the exertion of excessive force will be futile. The pin 150 might possibly be rotated enough to back it slightly out of contact with the coil end 152. The pin will not, however, serve to exert a driving or threading force on the spring end 152 as was the case when the inlet member was threaded to the faucet. Further attempts to rotate the inlet member 128 to remove it from the faucet will tend only to produce the constriction of the coil spring 146 about the threaded end 126 of the faucet and to create an even firmer engagement between faucet and spring and a compressive or jamming fit between the upper spring portion and flange 134. For all practical purposes therefore, the inlet member of the vacuum breaker becomes permanently connected to the faucet after it has been initially installed.

It is also possible in some applications of the embodiment of the invention to replace the pin 150 with a coil spring having a hooked lower end. This hook can be inserted into or anchored in opening similar to that provided for pin 150. The spring would be driven into threading relationship in a manner similar to that described with respect to the pin construction.

With the exception of the above and the elimination of a valve closure or follower assembly 116 of the type shown in FIG. 3, the vacuum breaker embodiment of FIGS. 5 and 6 of the invention is similar in all material respects to that shown in FIG. 3.

Various modes of carrying out the invention are contemplated as being within the scope of the following claims particularly pointing out and distinctly claiming the subject matter which is regarded as the invention.

I claim:

1. A vacuum breaker for securement to a fluid outlet comprising a body, the body having a fluid inlet end portion, a fluid outlet end portion and a fluid flow passage therebetween, valve means disposed in the fluid flow passage between the inlet and outlet end portions of the body; air passage means formed in the body of the vacuum breaker body establishing communication between the flow passage in the body and the exterior of the body, the air passage means being disposed to cooperate with the valve means to prevent vacuum produced siphoning from occurring through the vacuum breaker upstream from the valve means; and nonremovable screw connecting means for permanently connecting at least a portion of the vacuum breaker body to a fluid outlet, wherein the nonremovable screw connecting means includes a threaded opening and a breakoff screw threaded into the threaded opening, the breakoff screw being formed with a threaded body portion, a neck portion and a head portion, the head portion having means for threading the body portion into the threaded opening and for applying a breaking force to the breakoff screw, the neck portion of the breakoff screw being formed to produce the separation of the head portion from the body portion of the screw when a breaking force is applied to the head portion of the breakoff screw.

2. The vacuum breaker of claim 1, wherein the body includes a collar member, the collar member being provided with engaging means for maintaining at least one of the body end portions in a preselected position with respect to a fluid outlet, a threaded opening being formed in the collar member for receipt of the breakoff screw.

3 The vacuum breaker of claim 2 wherein the threads formed in the threaded opening of the collar member have an axial strength which exceeds the breaking strength of the neck portion of the screw to prevent the damaging of the threads formed in the threaded opening of the collar member as the collar member is permanently anchored to a fluid outlet.

4. The vacuum breaker of claim 2 wherein the inlet portion of the vacuum breaker body is provided with means for securing the inlet portion of the body in fluid communication with a fluid outlet, the collar member is telescoped over at least a portion of the body, at least a portion of the collar member is disposed in position retaining contact with respect to the vacuum breaker body, and the screw is threaded into the opening of the collar member for securing the collar member to a fluid outlet and for maintaining a predetermined position of the inlet member with respect to a fluid outlet.

5. The vacuum breaker of claim 4 wherein the collar member is provided with a projection, the inlet portion of the vacuum breaker body is provided with a surface means for complementing engagement with the projection of the collar member to maintain the body in a preselected relationship with respect to the collar member.

6. The vacuum breaker of claim 1 wherein the nonremovable screw connecting means includes a threaded opening formed in the body of the vacuum breaker, and the breakoff screw is threaded into the threaded opening.

7. The vacuum breaker of claim 6 wherein the threads formed in the threaded opening of the body of the vacuum breaker have an axial strength which exceeds the breaking strength of the neck portion of the breakoff screw to prevent the damaging of the threads formed in the threaded opening of the body as the body is permanently anchored to a fluid outlet.

8. The vacuum breaker of claim 1 wherein the inlet portion of the vacuum breaker body is secured in liquidtight engagement with the outlet portion of a fluid outlet, the fluid outlet being disposed in fluid communication with the fluid flow passage of the body, a threaded opening is provided in the inlet portion of the body forming a passage through a wall of the body, and a breakoff screw is threaded through the threaded opening in the body and into firm engagement with the outlet portion of the fluid outlet.

9. A vacuum breaker for securement to a fluid outlet comprising a body, the body having a fluid inlet end portion, a fluid outlet end portion and a fluid flow passage therebetween, valve means disposed in the fluid flow passage between the inlet and outlet end portions of the body; air passage means formed in the body of the vacuum breaker body establishing communication between the flow passage in the body and the exterior of the body, the air passage means being disposed to cooperate with the valve means to prevent vacuum produced siphoning from occurring through the vacuum breaker upstream from the valve means, the inlet portion of the vacuum breaker body is secured in essentially liquidtight engagement with the outlet portion of a fluid outlet, the fluid outlet being disposed in fluid communication with the fluid flow passage of the body, a collar member is telescoped over a portion of the fluid outlet, the collar member is disposed with at least a portion thereof in position retaining contact with respect to the inlet portion of the body, a threaded opening in the collar member forming a passage through a wall of the collar member, a screw is threaded through the threaded opening in the collar member and into firm engagement with a surface of the outlet portion of the fluid outlet, and means on the screw preventing withdrawal thereof from the threaded collar opening after firm engagement with the fluid outlet has been established.

10. A vacuum breaker for securement to a fluid outlet comprising a body, the body having a fluid inlet end portion, a fluid outlet end portion and a fluid flow passage therebetween, valve means disposed in the fluid flow passage between the inlet and outlet end portions of the body; air passage means formed in the body of the vacuum breaker body establishing communication between the flow passage in the body and the exterior of the body, the air passage means being disposed to cooperate with the valve means to prevent vacuum produced siphoning from occurring through the vacuum breaker upstream from the valve means, the inlet portion of the vacuum breaker body is secured in substantially liquidtight engagement with the outlet portion of a fluid outlet, the fluid outlet being disposed in fluid communication with the fluid flow passage of the body of the vacuum breaker, a collar member is telescoped over at least a portion of the fluid outlet, the collar member is disposed with at least a portion thereof in position retaining contact with respect to the inlet portion of the vacuum breaker body, and means are provided for securing the collar member to the fluid outlet in a substantially immobile, nonremovable relationship.